(12) United States Patent
Park et al.

(10) Patent No.: US 7,450,499 B2
(45) Date of Patent: Nov. 11, 2008

(54) METHOD AND APPARATUS FOR INTERCONNECTING IPV4 AND IPV6 NETWORKS

(75) Inventors: Soo-Hong Park, Yongin-si (KR); Young-keun Kim, Incheon Metropolitan (KR); Pyung-soo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 898 days.

(21) Appl. No.: 10/656,158

(22) Filed: Sep. 8, 2003

(65) Prior Publication Data

US 2004/0165602 A1 Aug. 26, 2004

(30) Foreign Application Priority Data

Feb. 21, 2003 (KR) .................. 10-2003-0011065
May 1, 2003 (KR) .................. 10-2003-0027999

(51) Int. Cl.
*H04L 12/26* (2006.01)
*H04L 12/28* (2006.01)

(52) U.S. Cl. ............... 370/229; 370/254; 370/389
(58) Field of Classification Search ......... 370/229–232, 370/252–254, 328, 389, 392, 400, 401, 466
See application file for complete search history.

(56) References Cited

U.S. PATENT DOCUMENTS

| | | | | |
|---|---|---|---|---|
| 6,038,233 A * | 3/2000 | Hamamoto et al. | ......... | 370/401 |
| 6,118,784 A * | 9/2000 | Tsuchiya et al. | ............ | 370/401 |
| 6,526,450 B1 * | 2/2003 | Zhang et al. | ................ | 709/245 |
| 6,725,253 B1 * | 4/2004 | Okano et al. | ................ | 709/203 |
| 6,845,091 B2 * | 1/2005 | Ogier et al. | ................ | 370/338 |
| 7,050,424 B2 * | 5/2006 | Cheng et al. | ................ | 370/352 |
| 7,085,270 B2 * | 8/2006 | Inouchi et al. | ............. | 370/392 |
| 2001/0040895 A1 * | 11/2001 | Templin | ..................... | 370/466 |
| 2002/0154624 A1 * | 10/2002 | Oishi et al. | ................. | 370/350 |
| 2003/0028763 A1 * | 2/2003 | Malinen et al. | ............. | 713/155 |
| 2003/0110292 A1 * | 6/2003 | Takeda et al. | ............... | 709/245 |
| 2003/0158940 A1 * | 8/2003 | Leigh | ......................... | 709/226 |
| 2003/0179742 A1 * | 9/2003 | Ogier et al. | ................. | 370/351 |

(Continued)

FOREIGN PATENT DOCUMENTS

JP 10-154994 6/1998

(Continued)

OTHER PUBLICATIONS

Narten, T et al, "Neighbor Discovery for IP Version 6 (IPV6)", RFC 2461, Dec. 1998.*

*Primary Examiner*—Hong Sol Cho
(74) *Attorney, Agent, or Firm*—Sughrue Mion, PLLC

(57) ABSTRACT

A method and system for interconnecting an Internet protocol version 4 (IPv4) network and an Internet protocol version 6 (IPv6) network are provided. The system for interconnecting an IPv4 network and an IPv6 network includes IPv4 nodes, IPv6 nodes, and apparatuses for transmitting IP packets between the IPv4 nodes and the IPv6 nodes, wherein the apparatuses for transmitting IP packets share processing state information of the IP packets, using a predetermined message, to distribute their load of processing the IP packets. The IPv4-IPv6 interconnection method involves appropriately arranging NAT-PT apparatuses depending on the size of the networks such that packet processing speed and performance are improved over the use of a single NAT-PT apparatus.

23 Claims, 9 Drawing Sheets

U.S. PATENT DOCUMENTS

2004/0001509 A1* 1/2004 Zhang et al. ............... 370/466
2004/0052257 A1* 3/2004 Abdo et al. ............... 370/392
2004/0111529 A1* 6/2004 Parmar ...................... 709/245
2004/0153502 A1* 8/2004 Jiang ......................... 709/203
2006/0227780 A1* 10/2006 Inouchi et al. ............. 370/389

FOREIGN PATENT DOCUMENTS

KP    1020010035062 A    5/2001

* cited by examiner

METHOD AND APPARATUS FOR INTERCONNECTING IPV4 AND IPV6 NETWORKS

This application claims the priority of Korean Patent Application No. 10-2003-0011065 filed Feb. 21, 2003 and No. 10-2003-0027999 filed May 1, 2003, the disclosures of which are incorporated herein by reference in their entirety.

BACKGROUND OF THE INVENTION

1. Field of the Invention

The present invention relates to an Internet protocol version 6 (IPv6), and more particularly, to interconnection between an IPv6 network and an Internet protocol version 4 (IPv4) network.

2. Description of the Related Art

Recently, the number of network apparatuses used in IPv6 networks has increased. However, the majority of network apparatuses are still used in existing IPv4 networks. Accordingly, interconnection between IPv6 networks and IPv4 networks and mutual translation of their IP addresses are needed.

In order for nodes connected to an IPv6 network and nodes connected to an IPv4 network to be interconnected and communicate with each other, an address translator which translates between IPv6 addresses and IPv4 addresses is needed. Among the methods of mutually translating IPv6 addresses and IPv4 addresses, a network address translation-protocol translation (NAT-PT) technique is widely known as an address translation and protocol translation technique used in IPv6-IPv4 networks.

The NAT-PT is a standard set up as RFC 2766 by the Internet international standardization organization, Internet Engineering Task Force (IETF) and describes a function for IPv6-IPv4 translation. According to the NAT-PT, a host or application connected to an IPv6 network can communicate with a host or application connected to an IPv4 network. The IPv6 host has only an IPv6 stack and the IPv4 host has only an IPv4 stack and an apparatus performing the NAT-PT is located on the boundary between the IPv6 network and the IPv4 network. In general, the apparatus performing the NAT-PT is in a location where a boundary router is, and has an IPv4/IPv6 dual stack. In addition, this apparatus performing the NAT-PT has an IPv4 address pool collecting IPv4 addresses which will be dynamically allocated when hosts connected to the IPv6 network desire to communicate with hosts connected to the IPv4 network.

The NAT-PT apparatus, as the name indicates, broadly performs two functions. The first one is a network address translation (NAT) function for performing address translation at a boundary router between two networks, with an IPv4 address pool for dynamically allocating IPv4 addresses to IPv6 nodes whenever a session is initialized. That is, the NAT-PT apparatus operates as an address mapper and translates addresses in the IPv4 and IPv6 packet headers.

The second function is protocol translation (PT) and the apparatus performs address translation based on the RFC 2765 standard document, stateless IP/ICMP translation (SIIT) algorithm, which defines a translation function in a host. In addition, in order to dynamically allocate and translate addresses, additional requirements including IP addresses and port information occur in a payload region by applications, and an application level gateway (ALG) should be used to support these requirements. As representative examples, there are DNS-ALG and FFP-ALG, and the DNS-ALG performs query type translation between type "AAAA" and type "A" queries, and address information exchange between DNSv4 and DNSv6. These ALGs are distinguished from an application proxy in that the ALGs do not need an additional exclusive protocol unlike the application proxy.

FIG. 1 is a diagram showing the interconnection of an IPv6 network and an IPv4 network through an NAT-PT apparatus.

The NAT-PT apparatus 110 translates an IPv4 address into an IPv6 address and vice versa. The NAT-PT apparatus 110 also comprises an SIIT performing unit which provides a function for translating between a 32-bit IPv4 header and a 128-bit IPv6 header.

FIG. 2 is a diagram illustrating translation between an IPv4 packet header and an IPv6 packet header, which is performed by an SIIT unit.

ToS field 201 of an IPv4 packet header 200 corresponds to Class field 251 of an IPv6 packet header 250. A value obtained by subtracting the length of the header from the total length 202 of the IPv4 packet header 200 is mapped to Payload Length field 252 of the IPv6 packet header 250. Also, TTL field 203 of the IPv4 packet header 200 corresponds to Hop Limit field 253 of the IPv6 packet header 250, and Protocol field 204 is mapped to Next Header field 254. Other fields of the IPv6 packet header 250 that are not defined in the IPv4 packet header 200 are calculated by themselves and inserted.

DNSv6 server 120 supports an AAAA-type query for searching for IPv6 addresses, and is a domain name server which provides IP addresses on the host name of the IPv6 network.

The NAT-PT specifications defined in the RFC 2766 define an IPv4 address pool which stores IPv4 addresses mapped with IPv6 addresses when an IPv6 address is translated into an IPv4 address; a DNS static mapping unit which performs mapping from an IPv4 address to an IPv6 address when, in order to find an IPv6 node which desires to transmits a packet, an IPv4 node sends a query for searching for the address of an IPv6 node to the DNSv6 server; and a mapping table which is a table storing a 96-bit dummy prefix which is a high-order prefix used when a 32-bit IPv4 address is translated into a 128-bit IPv6 address, and information on relations between translated IPv4 addresses and IPv6 addresses.

In order for a node 130a of the IPv6 network to be connected to a node 140a of the IPv4 network, a process such as the following is performed.

In order to find the address of the IPv4 node 140a, an A-type DNS query is transmitted to the DNSv6 server 120. However, the DNSv6 cannot find the address of the IPv4 node 140a. Accordingly, after finding the address of the DNSv4 server 150 stored in the secondary DNSv6 server, a packet is transmitted to the secondary DNSv4 server 150. The DNSv4 server 150 transmits the address of the IPv4 node 140a to the NAT-PT apparatus 110. Then, the NAT-PT apparatus 110 generates a 128-bit IPv6 address by adding a 96-bit prefix to the 32-bit address of the IPv4 node 140a included in the data packet, and transmits the data packet to the IPv6 node 130a.

Thus, after obtaining the IPv4 address, the IPv6 node transmits a packet desired to be transmitted, to the NAT-PT apparatus 110. Receiving the packet, the NAT-PT apparatus 110 translates the IPv6 address into the IPv4 address. As the source address, the IPv4 address mapped with the IPv6 address is fetched from the IPv4 address pool and used. As the destination address, the low-order 32-bits of the IPv6 address which is obtained by adding the 96-bit dummy prefix to the IPv4 address desired to be accessed, is used.

By using the thus obtained source address and destination address, a data packet is transmitted to the IPv4 node. Reversely, in order to transmit data from a node connected to the IPv4 network to a node connected to the IPv6 network, a mapping table is also generated in the NAT-PT apparatus 110 and the address is translated. That is, the mapping table is a table in which IPv4 addresses and IPv6 addresses are mapped with each other. The NAT-PT apparatus 110 transmits a packet to the IPv4 destination.

FIG. 3 is a diagram illustrating a process in which a session is set up from an IPv6 node to an IPv4 node by using NAT-PT.

If the source address of an IPv6 host 310 is FEDC:BA98:: 7654:3210 and the destination address is 132.146.243.30, the NAT-PT apparatus 320 uses an address pool 330 such that an IPv4 address corresponding to the source address FEDC: BA98::7654:3210 is allocated. Assuming that the allocated IPv4 address is 120.130.26.10, the source address is set to 120.130.26.10 at this time, and connected to the destination IPv4 host 340.

However, if this NAT-PT technique is used, all packets should be processed by the NAT-PT apparatus 320. Accordingly, as the number of nodes connected to the IPv6 network increases, the amount of data that needs to be processed by the NAT-PT apparatus 320 rapidly increases, and it is difficult to use the apparatus in a large-scale network.

To solve this problem, nodes connected to the IPv6 and IPv4 networks may be grouped into sub-groups, or networks may be designed to have a plurality of NAT-PT apparatuses. However, in such cases, information cannot be shared among the sub-nets or the plurality of NAT-PT apparatuses.

SUMMARY OF THE INVENTION

The present invention provides a method and system for interconnecting IPv6 and IPv4 networks that enable a plurality of network address translation-protocol translation (NAT-PT) apparatuses included therein to share data processing information among themselves using a redirect message defined in a neighbor discovery protocol (NDP).

The present invention also provides a method and system for interconnecting IPv6 and IPv4 networks that involve sequentially allocating a plurality of prefixes, which are used for translation between IPv4 and IPv6 addresses, to a plurality of NAT-PT apparatuses using a domain name service application level gateway (DNS-ALG), or allocating a prefix of the NAT-PT apparatus with the least load.

In accordance with an illustrative aspect of the present invention, there is provided an exemplary system for interconnecting an Internet protocol version 6 (IPv6) network including a plurality of IPv6 nodes, an Internet protocol version 4 (IPv4) network including a plurality of IPv4 nodes, and a plurality of apparatuses for transmitting IP packets between the IPv6 nodes and the IPv4 nodes, wherein the apparatuses for transmitting IP packets share processing state information of the IP packets, using a predetermined message, to distribute their load of processing the IP packets. Each apparatus for transmitting IP packets may transmit a packet via network address translation-protocol translation (NAT-PT).

Another exemplary system for interconnecting an IPv6 network and an IPv4 network according to the present invention comprises a plurality of IPv6 nodes, a plurality of IPv4 nodes, and a plurality of NAT-PT apparatuses for transmitting IP packets between the IPv6 nodes and the IPv4 nodes, wherein the NAT-PT apparatuses share processing state information of the IP packets, using a predetermined message, to distribute their load of processing the IP packets. In this exemplary embodiment, the predetermined message may be an Internet control message protocol version 6 (ICMPv6) redirect message defined in a neighbor discovery protocol (NDP).

In accordance with another illustrative aspect of the present invention, there is provided an exemplary NAT-PT apparatus comprising: a determination unit which receives an IPv6 packet and determines whether or not the received IPv6 packet is to be processed according to the current packet processing state of the NAT-PT apparatus; an IPv4 address pool which stores IPv4 addresses with which the address of an IPv6 node which transmitted the IPv6 packet is mapped to an IPv4 address and then used; a mapping table generation and storage unit which generates and stores a table for mapping an IPv4 address corresponding to the address of the IPv6 node; and an IP header translation unit which translates an IPv6 packet header into an IPv4 packet header.

In accordance with still another illustrative aspect of the present invention, there is provided an exemplary method of interconnecting an IPv6 network and an IPv4 network in an IPv6-IPv4 interconnection system comprising a plurality of IPv6 nodes, a plurality of IPv4 nodes, and a plurality of NAT-PT apparatuses for transmitting IP packets between the IPv6 nodes and the IPv4 nodes, wherein the NAT-PT apparatuses share processing state information of the IP packets, using a predetermined message, to distribute their load of processing the IP packets. The predetermined message may be an Internet control message protocol version 6 (ICMPv6) redirect message defined in a neighbor discovery protocol (NDP).

The present invention also provides an exemplary NAT-PT method performed in an NAT-PT apparatus, comprising: (a) receiving an IPv6 packet and determining whether or not the received IPv6 packet is to be processed according to the current packet processing state of the NAT-PT apparatus; (b) if the determination result indicates that the NAT-PT apparatus is capable of processing the received IPv6 packet, mapping the address of an IPv6 node which transmitted the IPv6 packet into an IPv4 address by using an IPv4 address pool which stores available IPv4 addresses; and (c) translating the header of the received IPv6 packet into an IPv4 packet header.

In accordance with still another illustrative aspect of the present invention, there is provided an exemplary method of interconnecting an IPv6 network and an IPv4 network in a network comprising a plurality of IPv6 nodes, a plurality of IPv4 nodes, and at least one apparatus for transmitting IP packets between the IPv6 nodes and the IPv4 nodes, the method comprising: (a) receiving a DNS message for searching for an IPv4 address of a destination domain name; (b) transmitting the received DNS message to a DNSv4 server and receiving an IPv4 address of the destination domain name from the DNSv4 server; (c) allocating a predetermined prefix to the received IPv4 address to translate the IPv4 address into an IPv6 address; and (d) transmitting the translated IPv6 address to a corresponding IPv6 node.

The present invention also provides an exemplary system for interconnecting an IPv6 network and an IPv4 network in a network including a plurality of IPv6 nodes, a plurality of IPv4 nodes, and at least one apparatus for transmitting IP packets between the IPv6 nodes and the IPv4 nodes, the system comprising: a DNS message receiving portion which receives a DNS message for searching for an IPv4 address of a destination domain address; an IPv4 address receiving portion which transmits the received DNS message to a DNSv4 server and receives an IPv4 address of the destination domain name; an address translation portion which allocates a predetermined prefix to the received IPv4 address to translate the IPv4 address to an IPv6 address; and a transmitting portion which transmits the translated IPv6 address to a corresponding IPv6 node.

In accordance with another illustrative aspect of the present invention, there is provided a computer readable medium having embodied thereon a computer program for the above exemplary methods of interconnecting an IPv6 network and an IPv4 network.

BRIEF DESCRIPTION OF THE DRAWINGS

The above and other objects and advantages of the present invention will become more apparent by describing in detail exemplary embodiments thereof with reference to the attached drawings in which.

DESCRIPTION OF ILLUSTRATIVE, NON-LIMITING EMBODIMENTS

The Internet control message protocol (ICMP) is a protocol for controlling a message between a host server and an Internet gateway and reporting an error, and is defined in RFC 792. Though the ICMP uses IP datagram, the message is processed by TCP/IP software and is not seen directly by application program users. For example, a ping command uses the ICMP in order to test an Internet connection. The ICMPv6 is the ICMP used in the IPv6.

Figure 4:
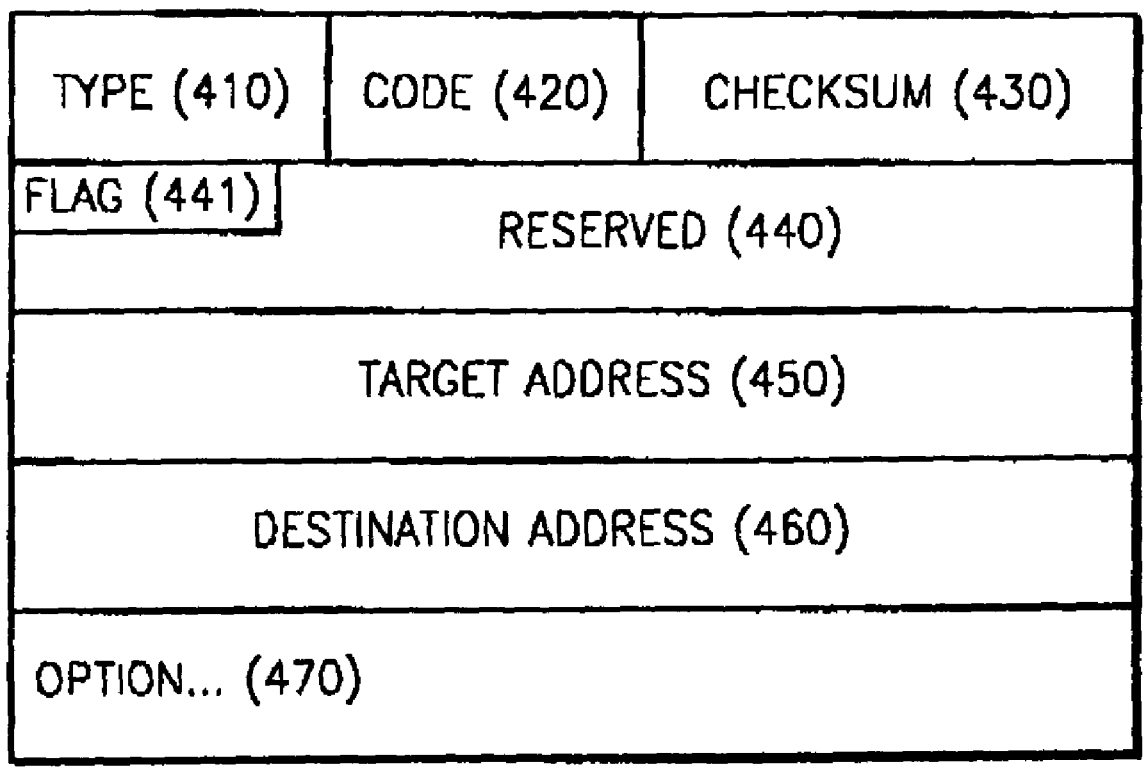
FIG. 4 is a diagram showing the format of an Internet control message protocol version 6 (ICMPv6) redirect message.

As shown in FIG. 4, the ICMPv6 redirect message comprises a type field 410, a code information field 420, a checksum field 430, a reserved field 440, a target address field 450, a destination address field 460, and an option field 470.

In the ICMP message specification, value 137 is stored in the type field 410 and 0 is stored in the code information field 420. These values are set in the ICMP message specification.

The checksum 430 is to check for an error and is the checksum of the ICMPv6. When there are too many packets that should be processed by the current NAT-PT apparatus and it is impossible to process all the packets, packets are redirected to a neighboring NAT-PT apparatus. In this case, the target address 450 stores the address of the NAT-PT apparatus to which the packets are redirected. The destination address field 460 stores the address of the current NAT-PT apparatus.

The reserved field 440 may have a flag 441 so that information indicating there are too many packets to be processed by the current NAT-PT apparatus and thus packets should be processed by another neighbor NAT-PT apparatus can be stored.

Figure 5:
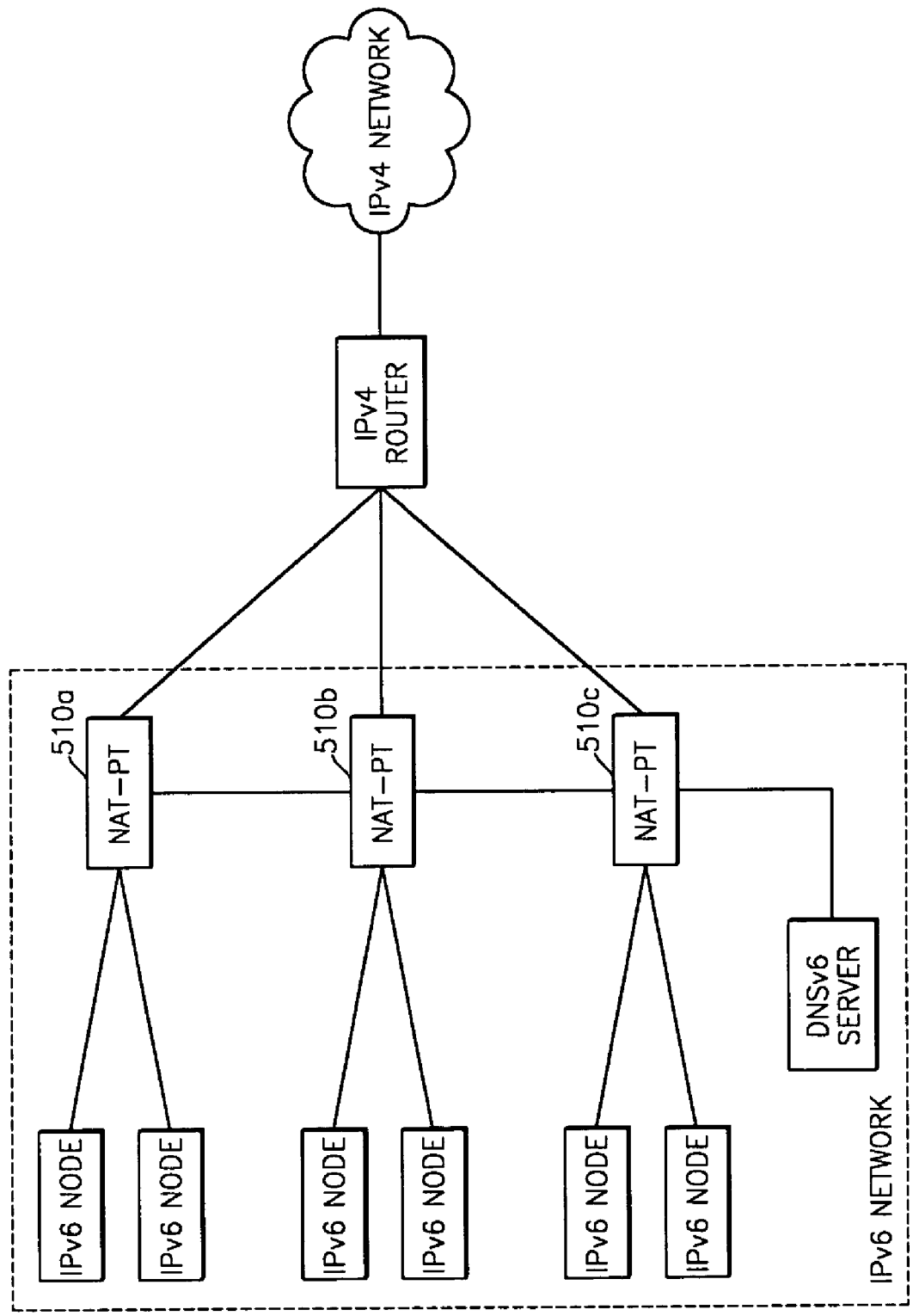
FIG. 5 is a diagram showing an interconnection of an IPv6 network and an IPv4 network through a plurality of NAT-PT apparatuses.

FIG. 5 is a diagram showing interconnection of an IPv6 network and an IPv4 network by using a plurality of NAT-PT apparatuses.

In the present invention, a plurality of NAT-PT apparatuses 510a through 510c are installed and a redirect message defined in the NDP is used among the plurality of NAT-PT apparatus so that if the amount of packets being processed by a particular NAT-PT apparatus is too big, other NAT-PT apparatuses can process subsequent packets.

Each NAT-PT apparatus can be aware of the current processing state of the packets by using a mapping table storing translated IPv4-IPv6 addresses. That is, the mapping table is dynamically generated and after a predetermined time, is deleted. If the size of the mapping table becomes greater than a predetermined size, it can be determined that the amount of packets currently being processed is too big. If the size of the mapping is predetermined, the rate of using the table that indicates how much part of the mapping table is being used can be observed in order to find the current processing state of the packets by the NAT-PT apparatus. Also, by observing how many IPv4 addresses are allocated and used from the IPv4 pool, the current processing state of the packets can be found.

At this time, by using a threshold indicating an appropriate amount of packets that can be processed by each NAT-PT apparatus, the efficiency of the NAT-PT apparatuses can be enhanced. Each threshold may be determined arbitrarily by the user. For example, if the threshold is set to 80% of each NAT-PT apparatus, when the amount of packets being processed by an NAT-PT apparatus becomes 80% of the ability of the NAT-PT apparatus, packets are transmitted to other NAT-PT apparatuses through a redirect message, and then processed.

Assuming that the threshold is set to 80%, a process for an IPv6 node accessing an IPv4 node will now be described. First, the IPv6 node transmits a packet to an NAT-PT apparatus. The NAT-PT apparatus which receives the packet translates the received packet into one having an IPv4 header and transmits it to the IPv4 node, if the processing state of the NAT-PT apparatus is less than the threshold 80%. If the processing state is equal to or greater than the threshold 80%, the NAT-PT apparatus transmits the packet to another NAT-PT apparatus by using the ICMPv6 redirect message.

Figure 3:
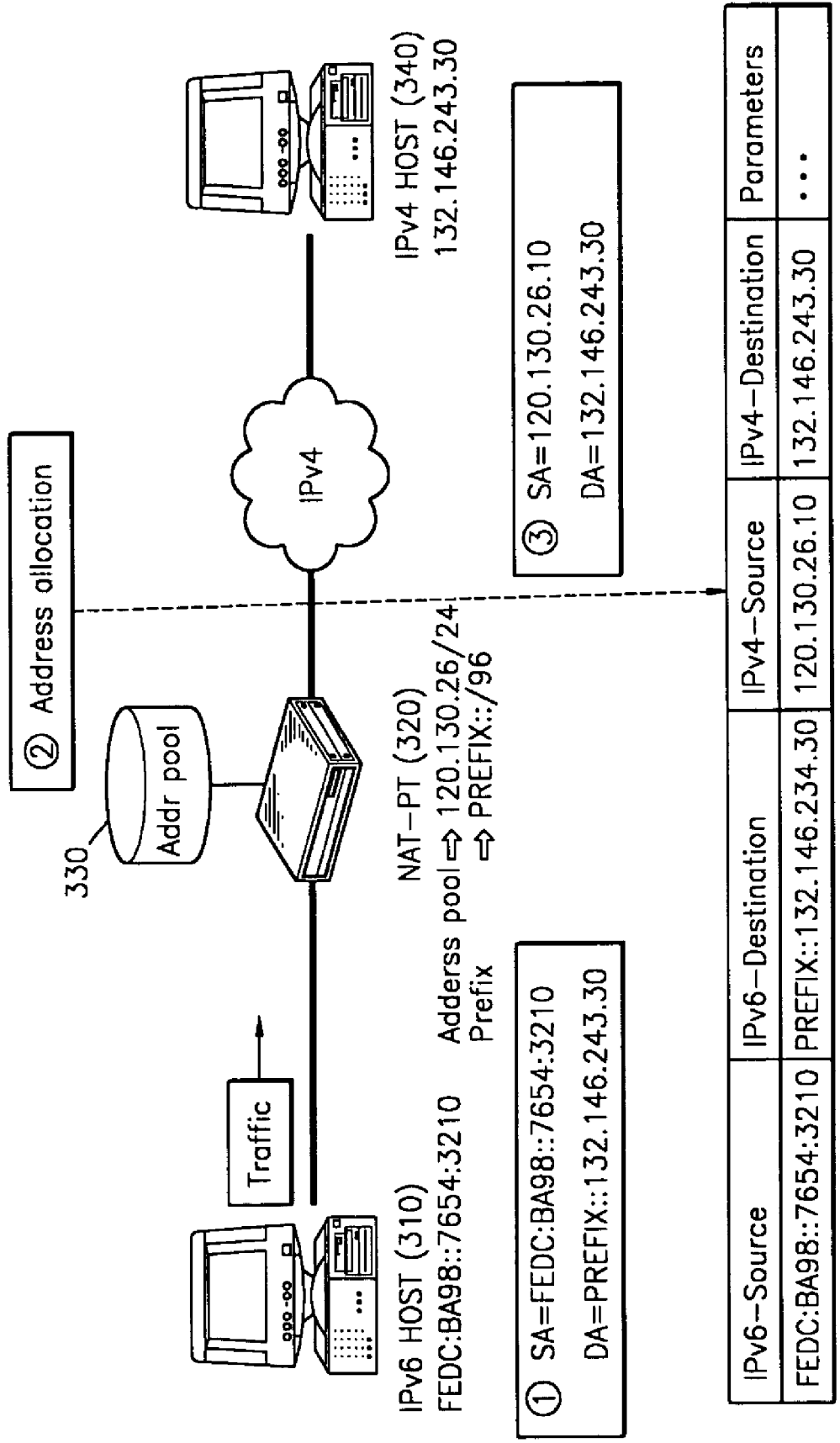
FIG. 3 is a diagram illustrating a process in which a session is set up from an IPv6 node to an IPv4 node by using NAT-PT.

That is, in the target address region of the ICMPv6 redirect message, the address of a neighboring NAT-PT apparatus is stored and the flag bit is set and then the redirect message is transmitted to the IPv6 node. Then, the IPv6 node which receives the redirect message, transmits the packet to the NAT-PT apparatus corresponding to the new target address, and after that, a session setting process described above with reference to FIG. 3 is carried out and then the packet is transmitted to the IPv4 node. By doing so, packets are distributed and processed.

Figure 6:
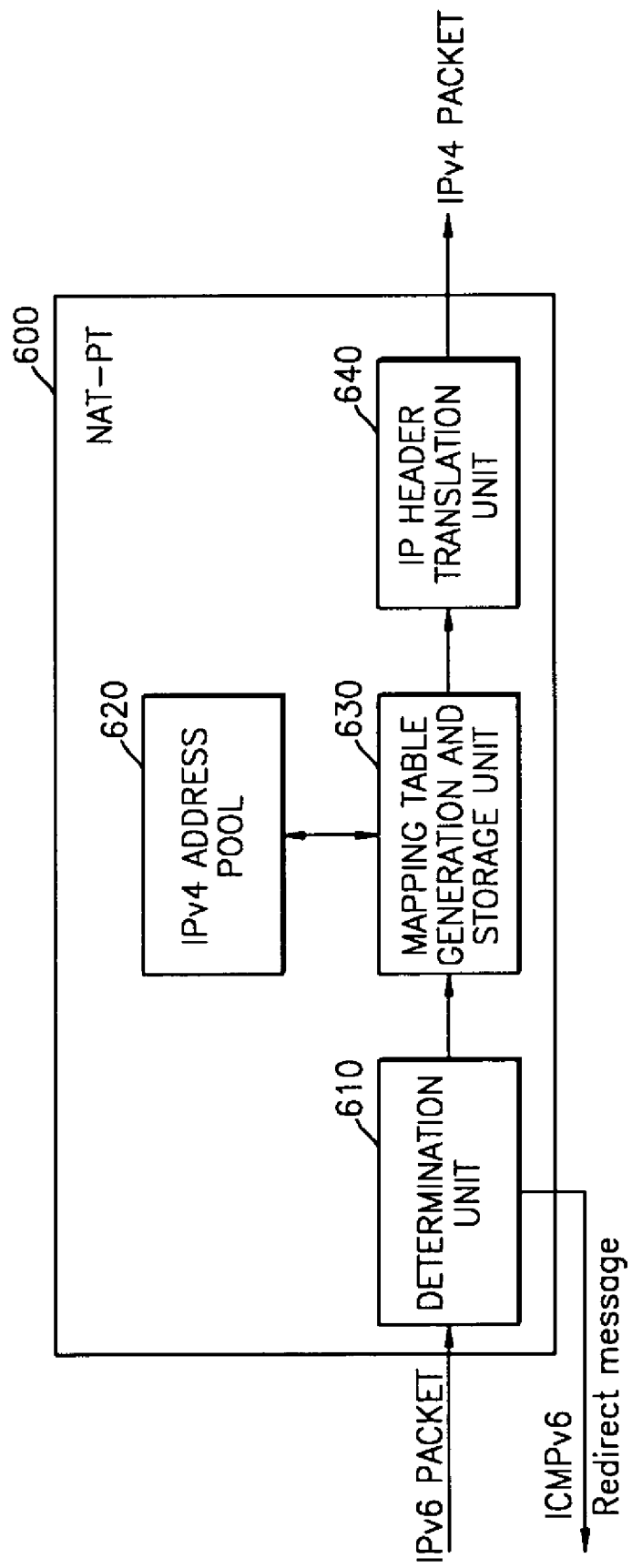
FIG. 6 is a detailed block diagram of an NAT-PT apparatus.

FIG. 6 is a detailed block diagram of an NAT-PT apparatus.

The NAT-PT apparatus 600 comprises a determination unit 610, an IPv4 address pool 620, a mapping table generation and storage unit 630, and an IP header translation unit 640.

The determination unit 610 receives an IPv6 packet, and determines whether or not the NAT-PT apparatus 600 can process the IPv6 packet, according to the current processing state of packets of the NAT-PT apparatus 600. The current processing state of the packets of the NAT-PT apparatus 600 can be found by using the size of the mapping table, the rate of use of the mapping table, or the state of use of the IPv4 address pool, as described above. If the processing state of packets which is equal to or greater than a predetermined threshold is reached, it means that it is difficult for the NAT-PT apparatus 600 to process additional packets. Accordingly, a command that the additional packets be transmitted from that time to another neighboring NAT-PT apparatus should be sent to the IPv6 node, and at this time a redirect message is used.

By allocating a flag bit in the reserved field of the redirect message, this information may be indicated by the flag bit. Also, the flag bit may not be used. In the target address field of the ICMPv6 redirect message, the address information of the neighbor NAT-PT apparatus is loaded.

The IPv4 address pool 620 stores IPv4 addresses that can be used by mapping IPv6 addresses into IPv4 addresses. The mapping table generation and storage unit 630 generates a table mapping IPv4 addresses corresponding to addresses of IPv6 nodes.

Figure 1:
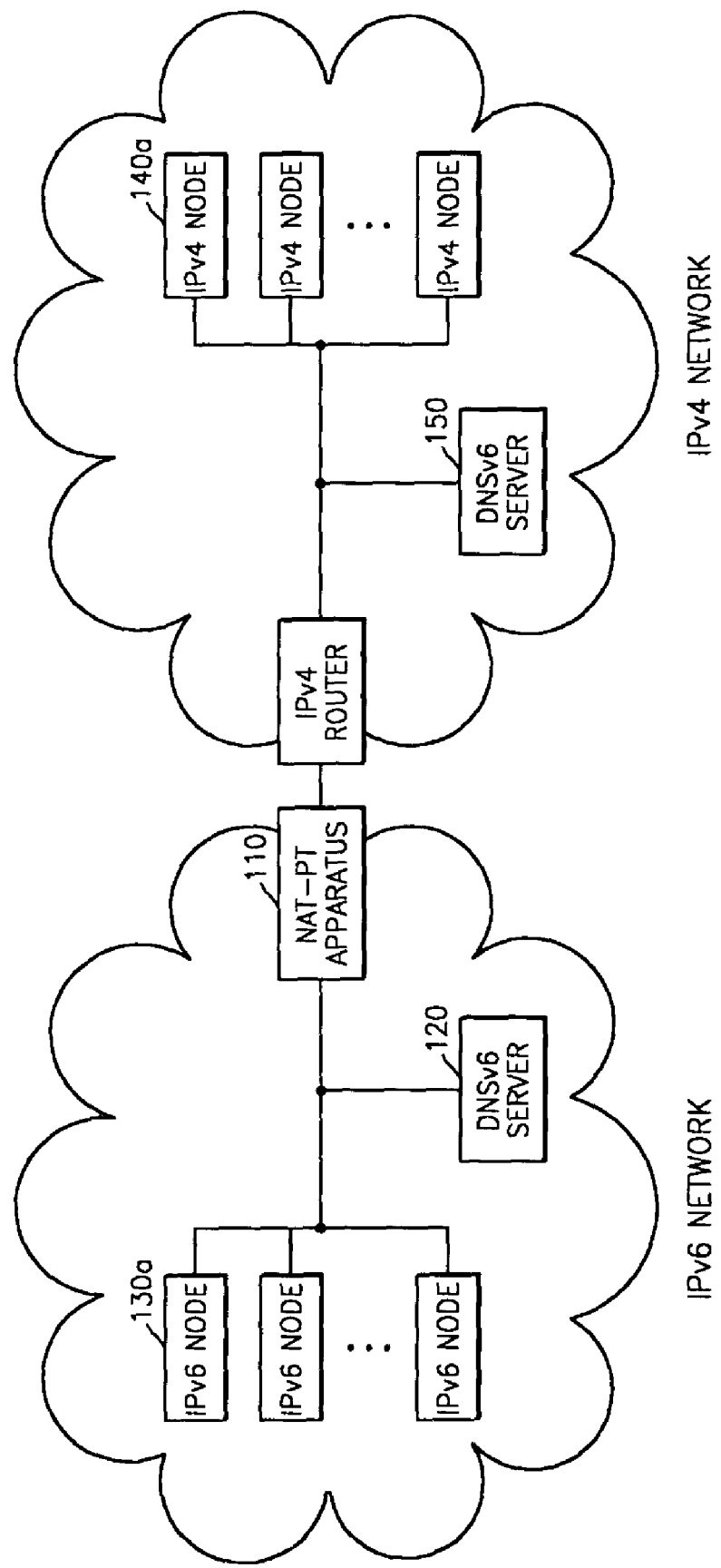
FIG. 1 is a diagram showing an interconnection of an IPv6 network and an IPv4 network through a network address translation-protocol translation (NAT-PT) apparatus.
Figure 2:
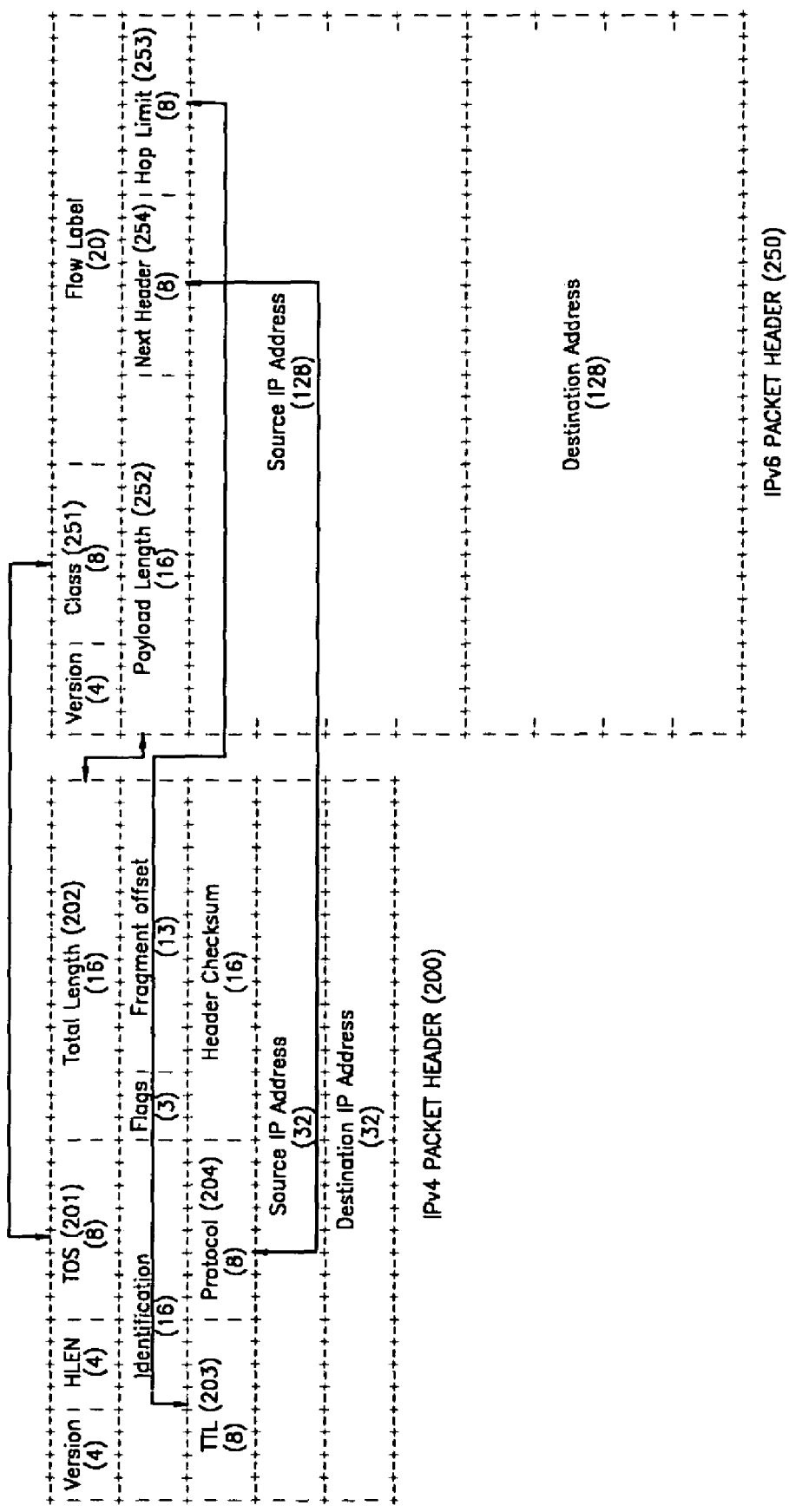
FIG. 2 is a diagram illustrating the translation between an IPv4 packet header and an IPv6 packet header by a stateless IP/ICMP translation (SIIT) algorithm.

The IP header translation unit 640 translates an IPv4 packet header into an IPv6 packet header. The translation can be performed using the SIIT technology. The translation of the header is carried out as described above referring to FIG. 2.

Figure 7:
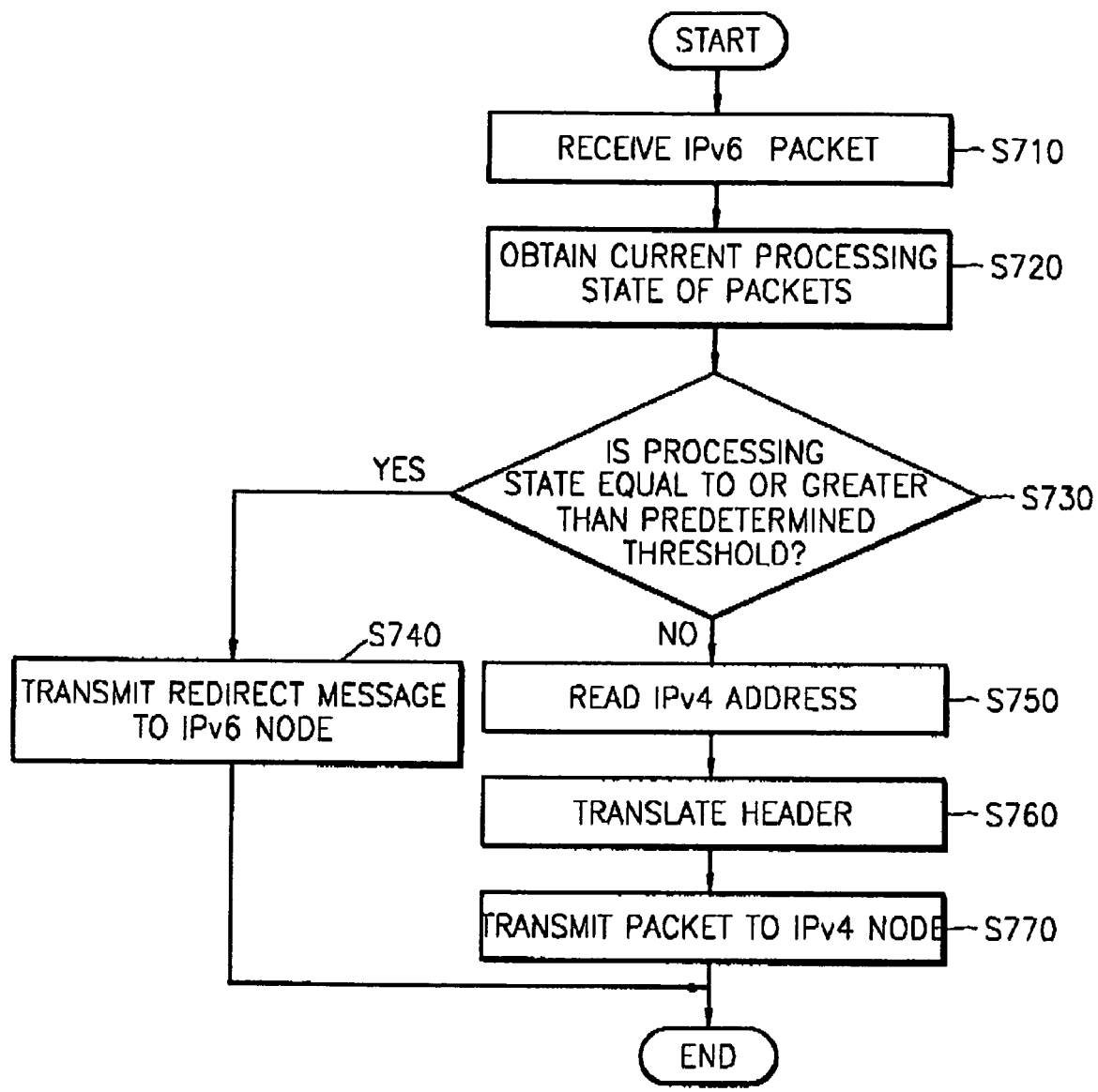
FIG. 7 is a flowchart illustrating a method of interconnecting an IPv6 network and an IPv4 network via a plurality of NAT-PT apparatuses according to the present invention.

FIG. 7 is a flowchart of a method of interconnecting an IPv6 network and an IPv4 network via a plurality of NAT-PT apparatuses according to the present invention.

First, an IPv6 packet is received in step S710. The current processing state of packets of the NAT-PT apparatus is received in step S720. If the current processing state of packets is equal to or greater than a predetermined threshold, which is set considering the processing capacity of the NAT-PT apparatus, the received packet cannot be processed and accordingly, information that no more IPv6 packets can be processed is transmitted to the IPv6 node in step S740. The current processing state of the packets can be found by using the size of the mapping table, the rate of use of the mapping table, or the state of use of the IPv4 address pool, as described above. The information indicating that no more IPv6 packets can be processed by the NAT-PT apparatus and the address information of another NAT-PT apparatus are transmitted to the IPv6 node through an ICMPv6 redirect message.

If the processing state is less than the predetermined threshold, an IPv4 address mapped with the IPv6 node address is read from the IPv4 address pool in step S750, the header of the received IPv6 packet is translated into an IPv4 header in step S760, and the packet transmitted by the IPv6 node is transmitted to the IPv4 node in step S770.

Figure 8:
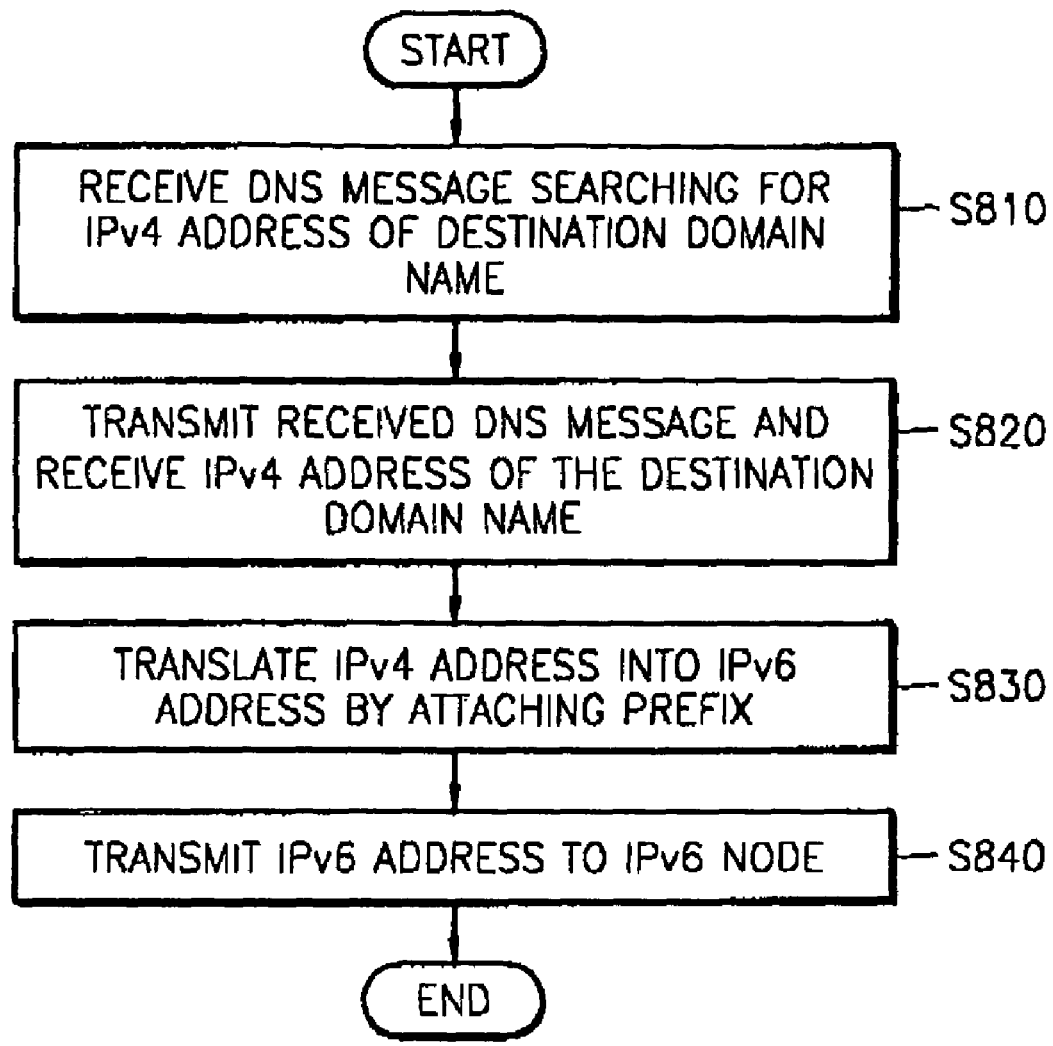
FIG. 8 is a flowchart illustrating a method of interconnecting an IPv6 network and an IPv4 network using a domain name service application level gateway (DNS-ALG) according to the present invention.

FIG. 8 is a flowchart illustrating an interconnection method between an IPv6 network and an IPv4 network using a domain name service-application level gateway (DNS-ALG) according to the present invention.

A DNS-ALG unit, which is installed in each NAT-PT apparatus, includes all network prefix information, i.e., prefix information allocated to each NAT-PT apparatus, and translates IPv4 addresses using prefix information into IPv6 addresses.

First, the DNS-ALG unit receives a DNS message for searching for an IPv4 address of a destination domain name in step S810. The DNS-ALG unit transmits the received DNS message to a DNSv4 server and receives the IPv4 address of the destination domain name from the DNSv4 server in step S820. The DNS message may include IPv4 node addresses and DNSv4 server addresses. The DNSv4 server addresses are convertible to IPv4 addresses. For example, in order to link an IPv6 node to an IPv4 node, the DNSv4 server searches for information on the IPv4 node address.

The DNSv4 server attaches a predetermined prefix to the received IPv4 address to translate it into an IPv6 address (step S830). Here, the predetermined prefix refers to one of the prefixes allocated to the NAT-PT apparatuses, which transfer IP packets, in a sequential order. Alternatively, a predetermined prefix may be allocated to an NAT-PT apparatus with the least load to translate the IPv4 address into an IPv6 address. To this end, information on the load of the NAT-PT apparatuses is received, for example, using a Code field of an ICMPv6 redirect message, described with reference to FIG. 4, and a QType field of a reply message, which will be described later with reference to FIG. 9. Here, the Code and QType fields have unspecified values. Finally, the translated IPv6 address is transmitted to the IPv6 node in step S840.

Figure 9:
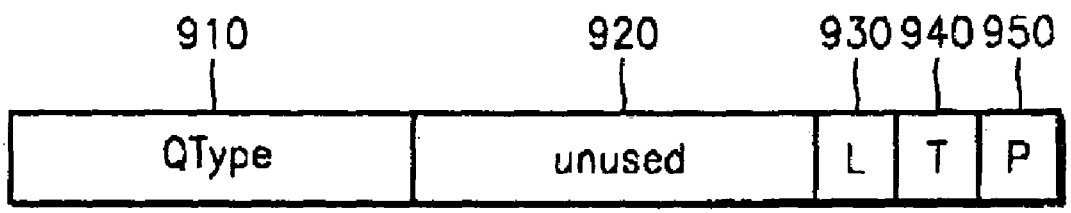
FIG. 9 illustrates the format of a reply message.

FIG. 9 illustrates the format of a reply message.

Referring to FIG. 9, a reply message includes a QType field 910, an unused field 920, an L field 930, a T field 940, and a P field 950. If the L field 930 is set to 1, it means that a link local address is requested. If the T field 940 is set to 1, it means that a threshold value is requested. If the P field 950 is set to 1, it means that prefix information is requested.

Figure 10:
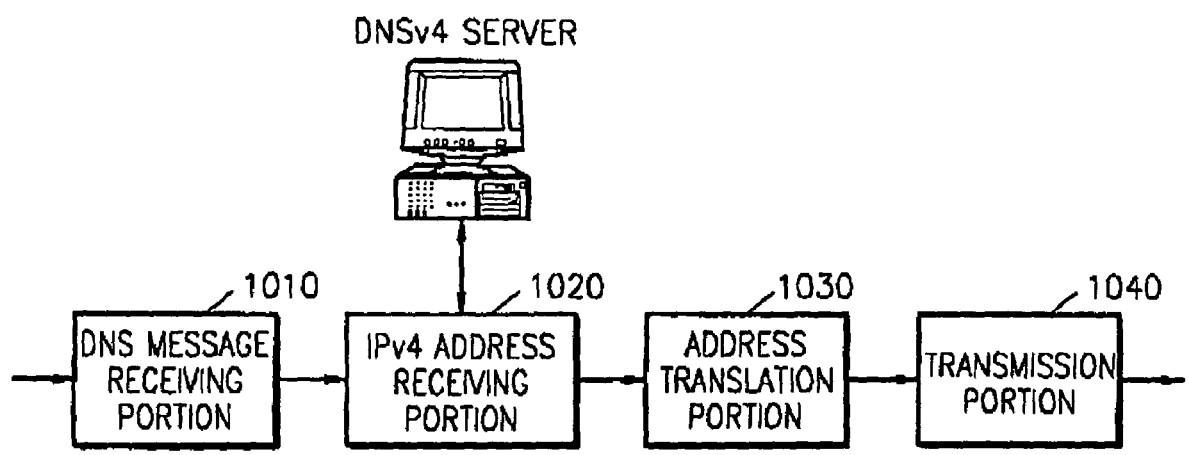
FIG. 10 is a block diagram of a DNS-ALG unit of an NAT-PT apparatus.

FIG. 10 is a block diagram of a DNS-ALG unit of an NAT-PT apparatus with a DNS-ALG function.

Referring to FIG. 10, the DNS-ALG unit includes a DNS message receiving portion 1010, an IPv4 address receiving portion 1020, an address translation portion 1030, and a transmission portion 1040.

The DNS message receiving portion 1010 receives a DNS message for searching for an IPv4 address of a destination domain name. The IPv4 address receiving portion 1020 transmits the received DNS message to a DNSv4 server and receives the IPv4 address of the destination domain name. The address transmission portion 1030 attaches a predetermined prefix to the received IPv4 address to translate it into an IPv6 address. The transmission portion 1040 transmits the translated IPv6 address to the IPv6 node.

The address translation portion 1030 may allocate a prefix in the order of prefixes which are previously allocated to the plurality of NAT-PT apparatuses. Alternatively, as described above with reference to FIGS. 8 and 9, the address translation portion 1030 may receive an ICMPv6 redirect message and a reply message to determine which NAT-PT apparatus has the least load and use the prefix allocated to the NAT-PT apparatus with the least load.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), and optically readable media (e.g., CD-ROMs, DVDs, etc.). Another exemplary embodiment of the invention is directed to carrier waves (e.g., transmissions over the Internet). Also, the computer readable recording media can be scattered on computer systems connected through a network and can store and execute a computer readable code in a distributed mode.

Illustrative embodiments have been described above and are shown. However, the present invention is not limited to these exemplary embodiments, and it is apparent that variations and modifications by those skilled in the art can be effected within the spirit and scope of the present invention defined in the appended claims. Therefore, the scope of the present invention is not determined by the above description but by the accompanying claims.

According to the present invention, the interconnection method between the IPv6 network and IPv4 network involves appropriately arranging NAT-PT apparatuses based on the size of the networks to improve packet processing speed and performance over the use of a single NAT-PT apparatus. In addition, by setting a threshold, an NAT-PT apparatus can be avoided from being overloaded. Also, since the ICMPv6 redirect message of a NDP is commonly used in existing routers, a distributed processing environment can be easily established.

Also, since one of prefixes allocated to a plurality of NAT-PT apparatuses can be chosen using a DNS-ALG function and translated into an IPv6 packet, an effect of equalizing load among the NAT-PT apparatuses appears.

What is claimed is:

1. A system for interconnecting an Internet protocol version 6 (IPv6) network and an Internet protocol version 4 (IPv4) network, comprising IP packet transmitting apparatuses transmitting IP packets between IPv6 nodes and IPv4 nodes and including:
   a first IP packet transmitting apparatus transmitting IP packets; and
   a second IP packet transmitting apparatus transmitting IP packets when the number of IP packets to be transmitted exceeds the processing capacity of the first IP packet transmitting apparatus,
   wherein the first and second IP packet transmitting apparatuses share processing state information of the IP packets using a predetermined message;
   wherein the predetermined message is an Internet control message protocol version 6 (ICMPv6) redirect message defined in a neighbor discovery protocol (NDP);
   wherein the ICMPv6 redirect message comprises:
      a flag bit that indicates the processing state of a first NAT-PT apparatus; and
      a target address field which stores the address of a second NAT-PT apparatus adjacent to the first NAT-PT apparatus.

2. The system of claim 1, wherein each of the first and second IP packet transmitting apparatuses transmits a packet via network address translation-protocol translation (NAT-PT).

3. A system for interconnecting an IPv6 network and an IPv4 network, comprising NAT-PT apparatuses transmitting IP packets between IPv6 nodes and IPv4 nodes and including:
   a first NAT-PT apparatus transmitting IP packets; and
   a second NAT-PT apparatus transmitting IP packets when the number of IP packets to be transmitted exceeds the processing capacity of the first NAT-PT apparatus,
   wherein the first and second NAT-PT apparatuses share processing state information of the IP packets using a predetermined message;
   wherein the predetermined message is an Internet control message protocol version 6 (ICMPv6) redirect message defined in a neighbor discovery protocol (NDP);
   wherein the ICMPv6 redirect message comprises:
      a flag bit that indicates the processing state of the first NAT-PT apparatus; and
      a target address field which stores the address of the second NAT-PT apparatus adjacent to the first NAT-PT apparatus.

4. The system of claim 3, wherein a packet processing state of the first or second NAT-PT apparatus is indicated by whether or not the current processing state of packets that is assessed by a size of an IPv6-IPv4 address translation mapping table installed in the corresponding NAT-PT apparatus or a rate of use of the mapping table is equal to or greater than a predetermined threshold that is indicative of the packet processing capacity of the NAT-PT apparatus.

5. The system of claim 3, wherein a packet processing state of the first or second NAT-PT apparatus is indicated by whether or not the current processing state of packets that is assessed by a state of use of an IPv4 address pool installed in the corresponding NAT-PT apparatus is equal to or greater than a predetermined threshold that is indicative of the packet processing capacity of the NAT-PT apparatus.

6. An NAT-PT apparatus comprising:
   a determination unit which receives an IPv6 packet and determines whether or not the received IPv6 packet is to be processed according to the current packet processing state of the NAT-PT apparatus;
   an IPv4 address pool which stores IPv4 addresses with which the address of an IPv6 node which transmitted the IPv6 packet is mapped to an IPv4 address and then used;
   a mapping table generation and storage unit which generates and stores a mapping table for mapping an IPv4 address corresponding to the address of the IPv6 node; and
   an IP header translation unit which translates an IPv6 packet header into an IPv4 packet header;
   wherein if it is determined that the NAT-PT apparatus is in a state of being incapable of processing the received IPv6 packet, the determination unit reports the state to the IPv6 node which transmitted the IPv6 packet;
   wherein reporting the state of the NAT-PT apparatus being incapable of processing packets to the IPv6 node which transmitted the IPv6 packet is performed by using an ICMPv6 redirect message;
   wherein the redirect message comprises:
      a flag bit that indicates the state of the NAT-PT apparatus being incapable of processing packets; and
      a target address field which stores an address of another NAT-PT apparatus.

7. The apparatus of claim 6, wherein the determination unit determines the current packet processing state of the NAT-PT apparatus based on whether or not a value according to a size of the mapping table, a rate of use of the mapping table, or a state of use of the IPv4 address pool is equal to or greater than a predetermined threshold.

8. The apparatus of claim 6, wherein the IP header translation unit translates an IP header by using a stateless IP/ICMP translation (SIIT) algorithm.

9. A method of interconnecting an IPv6 network and an IPv4 network in an IPv6-IPv4 interconnection system, the method comprising:
   transmitting, by a plurality of NAT-PT apparatuses, IP packets between the IPv6 nodes and the IPv4 nodes, and
   sharing, by the NAT-PT apparatuses, processing state information of the IP packets, using a predetermined message;
   wherein the predetermined message is an Internet control message protocol version 6 (ICMPv6) redirect message defined in a neighbor discovery protocol (NDP);
   wherein the ICMPv6 redirect message comprises:
      a flag bit that indicates the processing state of a particular NAT-PT apparatus; and
      a target address field which stores the address of another NAT-PT apparatus.

10. The method of claim 9, further comprising indicating a packet processing state of a particular NAT-PT apparatus by whether or not the current processing state of packets that is assessed by a size of an IPv6-IPv4 address translation mapping table installed in the particular NAT-PT apparatus or a rate of use of the mapping table is equal to or greater than a predetermined threshold that is indicative of the packet processing capacity of the particular NAT-PT apparatus.

11. The method of claim 9, further comprising indicating a packet processing state of a particular NAT-PT apparatus by whether or not the current processing state of packets that is assessed by a state of use of an IPv4 address pool installed in the particular NAT-PT apparatus is equal to or greater than a predetermined threshold that is indicative of the packet processing capacity of the particular NAT-PT apparatus.

12. An NAT-PT method performed in an NAT-PT apparatus, comprising:
   (a) receiving an IPv6 packet and determining whether or not the received IPv6 packet is to be processed according to the current packet processing state of the NAT-PT apparatus;
   (b) if the determination result indicates that the NAT-PT apparatus is capable of processing the received IPv6 packet, mapping an address of an IPv6 node which transmitted the IPv6 packet into an IPv4 address by using an IPv4 address pool which stores available IPv4 addresses; and
   (c) translating a header of the received IPv6 packet into an IPv4 packet header; and
   providing a processed IPv6 packet;
   wherein in step (a), if it is determined that the NAT-PT apparatus is in a state of being incapable of processing the received IPv6 packet, the state is reported to the IPv6 node which transmitted the IPv6 packet;
   wherein reporting the state of the NAT-PT apparatus being incapable of processing packets to the IPv6 node which transmitted the IPv6 packet is performed using an ICMPv6 redirect message;
   wherein the redirect message comprises:
   a flag bit that indicates the state of the NAT-PT apparatus being incapable of processing packets; and
   a target address field which stores an address of another NAT-PT apparatus.

13. The method of claim 12, wherein in step (a) the current packet processing state of the NAT-PT apparatus is determined based on whether or not a value according to a size of the mapping table, a rate of use of the mapping table, or a state of use of the IPv4 address pool is equal to or greater than a predetermined threshold to determine whether or not the received IPv6 packet can be processed by the NAT-PT apparatus.

14. The method of claim 12, wherein in step (c) an IP header is translated using a stateless IP/ICMP translation (SIIT) algorithm.

15. A computer readable medium having embodied thereon a computer program for an interconnection method of interconnecting an IPv6 network and an IPv4 network in an IPv6-IPv4 interconnection system, the method comprises:
   transmitting, by a plurality of NAT-PT apparatuses, IP packets between the IPv6 nodes and the IPv4 nodes, and
   sharing, by the NAT-PT apparatuses, processing state information of the IP packets, using a predetermined message;
   wherein the predetermined message is an Internet control message protocol version 6 (ICMPv6) redirect message defined in a neighbor discovery protocol (NDP);
   wherein the ICMPv6 redirect message comprises:
   a flag bit that indicates the processing state of a particular NAT-PT apparatus; and a target address field which stores the address of another NAT-PT apparatus.

16. A computer readable medium having embodied thereon a computer program for an NAT-PT processing method performed in an NAT-PT apparatus, comprising:
   (a) receiving an IPv6 packet and determining whether or not the received IPv6 packet is to be processed according to the current packet processing state of the NAT-PT apparatus;
   (b) if the determination result indicates that the NAT-PT apparatus is capable of processing the received IPv6 packet, mapping an address of an IPv6 node which transmitted the IPv6 packet into an IPv4 address by using an IPv4 address pool which stores available IPv4 addresses; and
   (c) translating a header of the received IPv6 packet into an IPv4 packet header;
   wherein in step (a), if it is determined that the NAT-PT apparatus is in a state of being incapable of processing the received IPv6 packet, the state is reported to the IPv6 node which transmitted the IPv6 packet;
   wherein reporting the state of the NAT-PT apparatus being incapable of processing packets to the IPv6 node which transmitted the IPv6 packet is performed using an ICMPv6 redirect message;
   wherein the redirect message comprises:
   a flag bit that indicates the state of the NAT-PT apparatus being incapable of processing packets; and
   a target address field which stores an address of another NAT-PT apparatus.

17. A method of interconnecting an IPv6 network and an IPv4 network in a network comprising at least one IP packet transmitting apparatus transmitting IP packets between the IPv6 nodes and the IPv4 nodes, the method comprising:
   (a) receiving a DNS message for searching for an IPv4 address of a destination domain name, transmitting the DNS message to a DNSv4 server, and receiving the IPv4 address of the destination domain name;
   (b) allocating a predetermined prefix to the received IPv4 address to translate the IPv4 address into an IPv6 address; and
   (c) transmitting the translated IPv6 address to a corresponding IPv6 node,
   wherein the predetermined prefix is the prefix of an apparatus with the least load among the at least one apparatus for transmitting IP packets, the apparatus for transmitting IP packets with the least load being identified by using a predetermined message regarding information on the load of the at least one apparatus for transmitting IP packets.

18. The method of claim 17, further comprising (d) transmitting a data packet to the IPv6 address as a destination address.

19. The method of claim 17, wherein the predetermined prefix is one of a plurality of prefixes allocated in a sequential order to the at least one apparatus for transmitting IP packets.

20. The method of claim 17, wherein the predetermined message is created using a Code field of an ICMPv6 redirect message and a QType field of a reply message.

21. A system for interconnecting an IPv6 network and an IPv4 network in a network comprising at least one IP transmitting apparatus transmitting IP packets between the IPv6 nodes and the IPv4 nodes, the system comprising:
   a DNS message receiving portion which receives a DNS message for searching for an IPv4 address of a destination domain address;

an IPv4 address receiving portion which transmits the received DNS message to a DNSv4 server and receives an IPv4 address of the destination domain name from the DNSv4 server;

an address translation portion which allocates a predetermined prefix to the received IPv4 address to translate the IPv4 address to an IPv6 address; and a transmitting portion which transmits the translated IPv6 address to a corresponding IPv6 node, wherein the predetermined prefix is the prefix of an apparatus with the least load among the at least one apparatus for transmitting IP packets, the apparatus for transmitting IP packets with the least load being identified by using a predetermined message regarding information on the load of the at least one apparatus for transmitting IP packets.

22. The system of claim 21, wherein the predetermined prefix is one of a plurality of prefixes allocated in a sequential order to the at least one apparatus for transmitting IP packets.

23. The system of claim 21, wherein the predetermined message is created using a Code field of an ICMPv6 redirect message and a QType field of a reply message.

* * * * *